Patented Feb. 6, 1923.

1,444,300

UNITED STATES PATENT OFFICE.

MORTIMER J. BROWN, OF LOS ANGELES, CALIFORNIA, ASSIGNOR TO THE PACIFIC R & H CHEMICAL CORPORATION, OF LOS ANGELES, CALIFORNIA, A CORPORATION OF CALIFORNIA.

PROCESS FOR PURIFYING LIQUID HYDROCYANIC ACID.

No Drawing.   Application filed August 12, 1920. Serial No. 403,073.

*To all whom it may concern:*

Be it known that I, MORTIMER J. BROWN, a citizen of the United States, residing at Los Angeles, in the county of Los Angeles and State of California, have invented a new and useful Process for Purifying Liquid Hydrocyanic Acid, of which the following is a specification.

This invention relates to a process of manufacturing liquid hydrocyanic acid and has for its object the removal therefrom of certain gaseous impurities, whereby the properties of the resulting purified product are improved to a marked degree.

It is well known that hydrocyanic acid can be produced by the reaction of acids upon metallic cyanides as well as by various other reactions; also that under the conditions prevailing for most of such reactions, hydrocyanic acid is produced as a gas; also that it can be easily liquefied at temperatures below its boiling point.

Substantially pure liquid hydrocyanic acid boils at atmospheric pressure at about $26\tfrac{1}{2}°$ C. It may therefore be used at atmospheric temperatures below that point with a fair degree of safety in so far as true boiling is concerned. I have found, however, that under certain circumstances liquid hydrocyanic acid appears to boil violently at temperatures as low as 20° C. Under such circumstances a large portion of the contents of the containing vessel has been known to be forcibly ejected, not only causing a loss of the liquid in question, but greatly menacing the lives of persons or animals that may be near. I have found that this action is caused by gaseous impurities that have been dissolved in the liquid during the process of manufacture and these gaseous impurities are generally contained in commercial liquid hydrocyanic acid, as heretofore made. I have found in manufacturing liquid hydrocyanic acid that hydrocyanic acid, water vapor, carbon dioxide and some other materials, are driven over from the generator. These go through a rectifying operation from which there issues hydrocyanic acid gas, carbon dioxide and water vapor. These are then all condensed together. By whatever process the liquid is manufactured, it is customary to condense it at low temperatures as for example, 0° C. These low temperatures are used because of the exceeding volatility of the material and consequent losses, if higher condensing temperatures are used. To cite an example, I have found that carbon dioxide dissolves in liquid hydrocyanic acid at 0° C. to the extent of about nine volumes of carbon dioxide in one volume of liquid hydrocyanic acid. If, after such gas is dissolved in the liquid, the latter is raised to a temperature higher than 0° C., it is possible for a condition of supersaturation to exist so that if at a higher temperature the condition of supersaturation is disturbed, there may be a heavy evolution of carbon dioxide so rapid as to give the appearance of violent boiling. The great solubility of carbon dioxide in liquid hydrocyanic acid and the possibility of supersaturation of carbon dioxide in liquid hdrocyanic acid are the explanation of the great danger of liquid hydrocyanic acid that is contaminated with carbon dioxide gas. I have discovered that the solubility of carbon dioxide increases with decreasing temperature and that none, or a negligible amount of the gas, is held in equilibrium at temperatures of, for example, from 20° C. up to the boiling point at $26\tfrac{1}{2}°$ C. If, therefore, liquid hydrocyanic acid that is contaminated with carbon dioxide is heated up to any desired higher temperature, preferably with agitation, the condition of equilibrium will be established at the higher temperature and the gas so evolved. After the removal of this gas, the liquid may again be cooled, if such is desirable, and such liquid will be safer than it was before heating. If very pure liquid hydrocyanic acid is desired the liquid should be heated to within one or two degrees of the boiling point of the acid. However, I find that heating to within ten degrees of the boiling point will produce satisfactory purification for some purposes, and for most work, heating should be done within ten degrees or less of the boiling point of the liquid.

The gaseous impurities present in commercial liquid hydrocyanic acid as ordinarily manufactured can be in a measure eliminated by storing the liquid in an open vessel and permitting the temperature to rise by natural means. However, such a method of purification is open to the objection that special precautions are not always easily maintained, without which liquid hydrocyanic acid is hazardous to store on account of its highly toxic and inflammable properties. Moreover, the elimination of the gaseous impurities by natural means is not as complete as when the purification is conducted according to the process of my invention. By gaseous impurities, I mean impurities having boiling points below the boiling point of liquid hydrocyanic acid.

My process consists in heating the contaminated material artificially so that the purification may be accomplished in a very short time, thus making possible subsequent refrigeration and marketing of the material without delay or the necessity of storage. I prefer in practicing this process of purification to heat the contaminated liquid almost to its boiling point and to agitate it at such temperature to accelerate the removal of the gaseous impurities. The liquid is heated and the contained gaseous impurities are driven off without any appreciable distillation of the liquid occurring. The liquid is flowed into a closed tank having a gas discharge pipe and a layer of liquid is maintained in the tank and heated. Gaseous impurities and hydrocyanic acid vapor will be present in the tank above the liquid, but because of the temperature maintained, the gaseous impurities, such as carbon dioxide, cannot redissolve in the liquid. The liquid, with its contaminating gaseous impurities, is flowed into the tank preferably continuously and the liquid free of gaseous impurities is flowed from the tank preferably continuously thereby separating the liquid from the evolved gases. After discharge from the tank, the liquid is cooled out of contact with gases which will be dissolved therein. When the amount of gaseous impurities is large, an appreciable amount of hydrocyanic acid vapor escapes from the tank during the ebullition which occurs while the gaseous impurities are being eliminated. For this reason, I prefer to refrigerate the vapors issuing from the liquid, and thereby recover the hydrocyanic acid which would otherwise be lost. This recovered hydrocyanic acid is heavily charged with gaseous impurities and must, therefore, be subsequently purified. I prefer to conduct this purification, as a separate operation in order to avoid mixing the rather impure recovered hydrocyanic acid with the regular run of product. In the application of this process of purification, I do not limit myself to carbon dioxide as the gaseous impurity nor to any specific methods of securing agitation, methods of heating, methods of subsequent cooling, nor methods of purifying the condensed vapor recovered from the heating vessel.

I claim:

1. The process of purifying liquid hydrocyanic acid containing gaseous impurities, which comprises heating said liquid to substantially its boiling point and separating the liquid from the evolved gaseous impurities.

2. The process of purifying liquid hydrocyanic acid containing gaseous impurities, which comprises heating said liquid to within 10° C. of its boiling point and separating the liquid from the evolved gaseous impurities.

3. The process of purifying liquid hydrocyanic acid, which consists in heating commercial liquid hydrocyanic acid to drive off the gaseous impurities without vaporizing any appreciable portion of the liquid hydrocyanic acid.

4. The process of purifying liquid hydrocyanic acid, which consists in heating commercial liquid hydrocyanic acid to drive off the gaseous impurities without vaporizing any appreciable portion of the liquid hydrocyanic acid, separating the liquid from the gases and cooling the liquid.

5. The process of purifying liquid hydrocyanic acid containing gaseous impurities which comprises heating said liquid to substantially its boiling point, agitating the heated liquid, separating the liquid from the evolved gaseous impurities and refrigerating the separated liquid.

6. The process of purifying liquid hydrocyanic acid containing gaseous impurities which comprises heating the liquid within 10° C. of its boiling point, agitating the heated liquid, separating the liquid from the evolved gaseous impurities and refrigerating the separated liquid.

7. The process of purifying liquid hydrocyanic acid containing gaseous impurities which comprises heating the liquid to substantially its boiling point, agitating the heated liquid and separating the liquid from the evolved gaseous impurities.

8. The process of purifying liquid hydrocyanic acid containing gaseous impurities which comprises heating the liquid to within 10° C. of its boiling point, agitating the heated liquid and separating the liquid from the evolved gaseous impurities.

9. The process of purifying liquid hydrocyanic acid containing gaseous impurities which comprises heating the liquid to substantially its boiling point and agitating the heated liquid.

10. The process of purifying liquid hydrocyanic acid containing gaseous impurities which comprises heating the liquid to within 10° C. of its boiling point and agitating the heated liquid.

In testimony whereof, I have hereunto set my hand at Los Angeles, this 4th day of August, 1920.

MORTIMER J. BROWN.